(12) United States Patent
Garg et al.

(10) Patent No.: US 11,692,637 B2
(45) Date of Patent: Jul. 4, 2023

(54) PRE-INSULATED VALVES FOR FLUID SYSTEM

(71) Applicant: Priyank S. Garg, Delhi (IN)

(72) Inventors: Priyank S. Garg, Delhi (IN); Mudassir Alam, Delhi (IN); Ved Prakash, Delhi (IN); Omkesh Singh, Delhi (IN); Anoop Kesharwani, Delhi (IN)

(73) Assignee: Priyank S. Garg, Delhi (IN)

( * ) Notice: Subject to any disclaimer, the term of this patent is extended or adjusted under 35 U.S.C. 154(b) by 526 days.

(21) Appl. No.: 16/642,173

(22) PCT Filed: Jan. 31, 2019

(86) PCT No.: PCT/IN2019/050073
§ 371 (c)(1),
(2) Date: Feb. 26, 2020

(87) PCT Pub. No.: WO2019/150390
PCT Pub. Date: Aug. 8, 2019

(65) Prior Publication Data
US 2021/0071774 A1 Mar. 11, 2021

(30) Foreign Application Priority Data
Jan. 31, 2018 (IN) .............................. 201811003702

(51) Int. Cl.
*F16K 27/02* (2006.01)
*F16K 1/22* (2006.01)
(Continued)

(52) U.S. Cl.
CPC ............ *F16K 27/0218* (2013.01); *F16K 1/22* (2013.01); *F16K 1/221* (2013.01); *F16K 1/2263* (2013.01); *F16L 59/16* (2013.01)

(58) Field of Classification Search
CPC ........ F16K 27/0218; F16K 1/22; F16K 1/221; F16K 1/2263; F16K 27/00; F16K 25/005;
(Continued)

(56) References Cited

U.S. PATENT DOCUMENTS

| | | | |
|---|---|---|---|
| 1,774,732 A | * | 9/1930 | Smith ................... F16L 59/161 |
| | | | 138/161 |
| 3,556,158 A | | 1/1971 | Schneider |

(Continued)

FOREIGN PATENT DOCUMENTS

| | | |
|---|---|---|
| CN | 2611702 Y | 4/2004 |
| CN | 202173712 U | 3/2012 |

(Continued)

OTHER PUBLICATIONS

Chinese Search Report pertaining to Application No. 2019800040438 dated Dec. 11, 2020.
(Continued)

*Primary Examiner* — John Bastianelli
(74) *Attorney, Agent, or Firm* — Dinsmore & Shohl LLP

(57) ABSTRACT

Pre-insulated valves (102, 144) for a fluid system, comprising valve body (104, 146) having lugs (128, 168). The valves (102, 144) comprises first insulating layer (134, 172) comprising an inner surface (136, 174) being adapted to cover an entire outer surface (132, 176) of the plurality of lugs (128, 168) and an entire outer surface (130, 170) of the valve body (104, 146) such that the first insulating layer (134, 172) is in close physical contact with the outer surface (130, 170) of the valve body (104, 146) including an outer surface (132, 176) of the plurality of lugs (128, 168). The valves (102, 144) comprises second insulating layer (138, 178) comprising an inner surface (140, 180) being adapted to be in close physical contact with an entire outer surface (137, 182) of the first insulating layer (134, 172).

10 Claims, 9 Drawing Sheets

(51) Int. Cl.
*F16K 1/226* (2006.01)
*F16L 59/16* (2006.01)

(58) Field of Classification Search
CPC .... F16L 59/16; F16L 59/161; Y10T 137/7036
USPC .............................. 251/305; 137/375; 285/47
See application file for complete search history.

(56) References Cited

U.S. PATENT DOCUMENTS

| | | | | |
|---|---|---|---|---|
| 3,724,491 | A * | 4/1973 | Knudsen ............... | F16L 59/161 138/149 |
| 4,259,981 | A * | 4/1981 | Busse ................... | F16L 59/161 285/47 |
| 4,653,724 | A * | 3/1987 | Garrigues ............. | F16K 1/2265 277/647 |
| 4,696,324 | A | 9/1987 | Petronko | |
| 4,807,669 | A * | 2/1989 | Prestidge, Sr. ....... | F16L 59/161 138/149 |
| 4,925,605 | A * | 5/1990 | Petronko ................ | F16L 59/04 264/342 R |
| 5,797,415 | A * | 8/1998 | Nicholson ............. | F16L 59/16 137/15.01 |
| 5,900,195 | A * | 5/1999 | Pool .................... | F16L 13/0272 264/46.5 |
| 6,142,173 | A * | 11/2000 | Bekeredjian .......... | F16K 1/2265 251/306 |
| 6,547,908 | B2 * | 4/2003 | Keyes ................... | F16L 59/143 156/155 |
| 7,472,476 | B2 * | 1/2009 | Gronquist ............... | B29C 39/22 285/21.2 |
| 9,476,539 | B2 * | 10/2016 | Grieser-Schmitz ..... | F16L 59/20 |
| 2015/0014570 | A1 | 1/2015 | Sarda et al. | |

FOREIGN PATENT DOCUMENTS

| | | |
|---|---|---|
| CN | 202660163 U | 1/2013 |
| DE | 19721652 A1 | 1/1999 |
| DE | 20200800470 U1 | 5/2008 |
| IN | 2350/CHE/2011 A | 7/2011 |
| KR | 101599449 B1 * | 3/2016 |
| WO | 2013124789 A2 | 8/2013 |
| WO | 2017013540 A1 | 1/2017 |

OTHER PUBLICATIONS

Chinese Office Action pertaining to Application No. 2019800040438 dated Jan. 11, 2021.
India Post Grant Opposition pertaining to Application No. 201811003702, now Patent No. 325764, dated Nov. 25, 2020.
Search Report and Written Opinion pertaining to Application No. PCT/IN2019/050073 dated Apr. 10, 2019, 7 pages.

* cited by examiner

PRE-INSULATED VALVES FOR FLUID SYSTEM

TECHNICAL FIELD OF THE INVENTION

The present disclosure relates to valves. More particularly relates to pre-insulated valves for a fluid system.

BACKGROUND OF THE INVENTION

Various industrial processes move around fluids in pipes at different temperatures, such as, but not limited to, chilled water for air conditioning cooling application, hot water for heating needs, and hot hydrocarbons for process conditions. When these fluids are moved through the pipes, there is a heat exchange with the atmosphere to which the pipes are exposed and that affects the temperature of the fluids. This reduces efficacy of the process for which the fluid temperature was achieved. In an example, if the fluid is intended for heat transfer such as for air conditioning, energy efficiency is reduced. In another example, if the fluid temperature has been changed for process needs, the process efficacy and yield may also be affected. Therefore, the fluid piping system is generally insulated to prevent the heat transfer and achieve optimal efficiencies. The typical normal system of on-site insulation however includes one or more limitations such as, labour intensive, site delays, ineffective due to difficulties in achieving ideal insulation in an installed system, impossible to validate as per specification.

The practice of using the pre-insulated pipes is well established in the industry. Various systems of insulation are deployed for pre-insulating the pipes. However, so far, pre-insulation of valves has not been brought into practice. This is primarily because valves of size two inches and greater, need to be connected to the piping through flange joints and bolting on the flange joints. So the aspect of pre-insulation is established and well-practiced in pipes but not yet deployed for valves. As a result, valve insulation is still done on-site, mostly by creating a 'valve box'. Apart from the cost, this is often a source of condensation in a plant as the site insulation is most often inadequate because, it leaves some air pockets and gaps due to tight shapes with bolts around the valves, and inability to ensure adequate insulation exists on each part of the surface since the valve shape is not simple like a pipe and has a proprietary form and contours.

When pre-insulated valves have been tried, they have been attempted with moving the bolting of the valve to the piping system outside of the insulation and having the bolts tighten on the flange insulated surface. This also has problems like, the bolting used to connect the valve to the flanges remain outside of the valve insulation. This makes the bolting larger and non-standard since now a larger size flange has to be used to ensure that the bolts come from outside of the valve body insulation. Also, the bolts in this case remain exposed without any insulation and become a source of condensation.

Further, the bolting sits on the flange's insulated outer face and this causes the flange joint to be weak and not effective as the bolting pressure on the insulation material causes the insulation to compress and relieve the forces required to seal the flange gaskets, making the flange joint ineffective and causes leaks from the valve.

One kind of pre-insulation of valves has been provided in U. S. Patent Publication No. 20150014570A1 (hereafter referred to as the Pat Publ. No. '570). The disclosure in the Pat Publ. No. '570 is directed towards a pre-insulated control valve, a strainer of a piping system, a method of pre-insulating a control valve and a strainer. The method involves providing a rigid polymeric foam, casting an insulation layer having a predetermining thickness from the polymeric foam designed to reduce thermal conduction between the valve or the strainer and the surface coming in contact with the valve or the strainer, coupling the control valve or the strainer with the insulation layer to provide a pre-insulated control valve or a pre-insulated strainer and engaging the pre-insulated control valve or the pre-insulated strainer in the fluid distribution system at multiple predetermined locations.

In the Pat Publ. No. '570, the pre-insulated valve is enveloped with the polyurethane foam material that acts as an insulation layer to protect the fluid distribution from external environmental adversaries, as well to provide a safe handling of the valve and piping components by people coming into contact with them. The piping components like the tubing and valve junctions are also insulated at the fabrication unit with two hollow, semi-cylindrical polymer sleeves which are coupled on ventral and dorsal surfaces of the insulation layer through uniformly distributed latch and socket provisions. These fastening provisions are located on the dorsal and ventral surfaces of the insulation layer to facilitate a close and firm wrapping of the polymer layer around the valves and other components of the piping system. The disclosed pre-insulated valve in the Pat Publ. No. '570 includes latch and socket provisions, which may not be feasible for applying onto the valve and piping system in which fastening bolts and nuts. If fastening bolts and nuts are used, the insulation provided on the valve and piping system may deteriorate before the desired useful life and may also pose inefficient thermal insulation.

Another kind of thermal insulation of valves and flanged pipe connections is described in DE19721652A1 (hereinafter referred to as the Pat '652). The thermally-insulating casing in the Pat '652 comprises two halves which include openings for pipes and as appropriate, valve actuation. The halves are detachable at a plane of separation. They have interlocking, peripheral, tongue-and-groove connections. These preferably centre and attach the halves. The halves are fire-resistant polyurethane foam, formed by reaction injection moulding. At the periphery, butting edges are sealed. Preferably during moulding, the halves are given an internal reflective coating comprising a polyurethane paint, applied by in-mould coating.

The thermal insulation in the Pat '652 includes two halves and may tend to deteriorate before the desired useful life. Also, since the two halves are attached to cover the piping and valve, the insulation may not be fully leak proof, thus may result in leakages.

The present disclosure is directed to overcome one or more of the problems and/or limitations as set forth above.

SUMMARY OF THE INVENTION

In an embodiment of the present disclosure, a pre-insulated valve for a fluid system is disclosed. The pre-insulated valve comprises a valve body having a plurality of lugs on an outer surface of the valve body. Each lug of the plurality of lugs is adapted to accommodate a fastener member for fastening the valve body with a flange member of a fluid pipe. The pre-insulated valve further comprises a first insulating layer made of a low density polymer. The first insulating layer includes an inner surface adapted to cover an entire outer surface of the plurality of lugs of the valve body and an entire outer surface of the valve body such that the first insulating layer is in close physical contact with the outer surface of the valve body including an outer surface of the plurality of lugs. The pre-insulated valve further comprises a second insulating layer made of a high density polymer. The second insulating layer includes an inner surface being adapted to be in close physical contact with an entire outer surface of the first insulating layer.

In another embodiment of the present disclosure, a pre-insulated valve for a fluid system is disclosed. The pre-insulated valve comprises a valve body having a pair of flange members. Each flange member is provided with a plurality of threaded blind holes for accommodating a fastener member for fastening the valve body with a flange member of a fluid pipe. The pre-insulated valve further comprises a first insulating layer made of a low density polymer. The first insulating layer comprises an inner surface adapted to cover an entire outer surface of the pair of flange members of the valve body and an entire outer surface of the valve body such that the first insulating layer is in close physical contact with the outer surface of the valve body including the outer surface of the pair of flange members. The pre-insulated valve further comprises a second insulating layer made of a high density polymer. The second insulating layer comprises an inner surface adapted to be in close physical contact with an entire outer surface of the first insulating layer.

In an embodiment of the present disclosure, the first insulating layer is made of polyurethane foam material.

In an embodiment of the present disclosure, the first insulating layer is having a density ranging from about 65 to 75 kg/m$^3$, preferably 70 kg/m$^3$.

In an embodiment of the present disclosure, the second insulating layer is made of high density polyethylene material.

In an embodiment of the present disclosure, the first insulating layer has relatively larger thickness when compared with the second insulating layer.

In an embodiment of the present disclosure, a combined thickness of the first insulating layer and the second insulating layer is such that a surface temperature of an outer surface of the second insulating layer is above a dew point to prevent condensation.

In another embodiment of the present disclosure, the flange member of the pipe includes a plurality of through holes axially aligned with the blind holes of the flange members of the valve body.

In another embodiment of the present disclosure, threaded portion of the plurality of fasteners is enclosed wholly inside the blind holes of the flange member of the valve body and the plurality of through holes of the flange member of the pipe.

In another embodiment of the present disclosure, an insulation external to an assembly of the pre-insulated valve is provided.

BRIEF DESCRIPTION OF THE ACCOMPANYING DRAWINGS

FIG. 4b shows a magnified view of portion of a lug body shown in FIG. 4a;

FIG. 9b shows a sectional view along an axis A-A' of the flange member shown in FIG. 9a.

DETAILED DESCRIPTION OF THE INVENTION WITH REFERENCE TO ACCOMPANYING DRAWINGS

Provided below is a non-limiting exemplary embodiment of the present invention and a reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claim.

Figure 1:
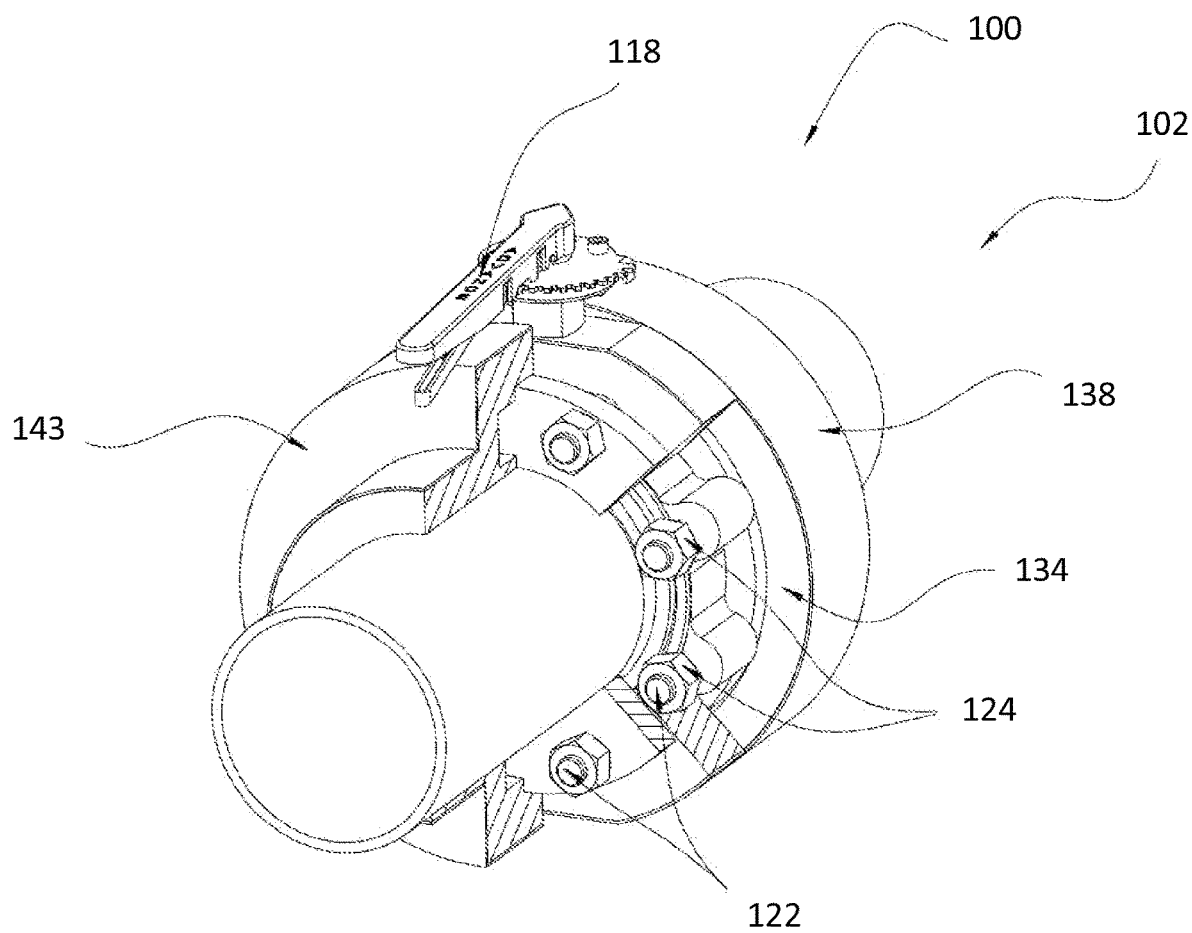
FIG. 1 shows a perspective view of an assembly of a butterfly valve with pre-insulation according to an exemplary embodiment of the present disclosure.

FIG. 1 illustrates a perspective view of an assembly (100) of a butterfly valve (102) with pre-insulation according to an exemplary embodiment of the present disclosure. The butterfly valve (102) in the illustration includes a lug-style or lugged valve body (104) (shown in FIGS. 2-5). It may be noted that the butterfly valve (102) or the valve may be any other valve which may be used in a fluid system for regulating the fluid flow inside a piping system (106) (shown in FIGS. 2 and 3). That is to say, the butterfly valve (102) will be typically be used to interrupt product flow such as a liquid, gas product during a process within the fluid system (not shown). For example, hot or heated fluid may include, but not limited to, water and oil. In another example, the cold or chilled fluid may include, but not limited to, liquid nitrogen, argon, helium, hydrogen and oxygen. It may be noted that the term "hot or heated fluid" used in the description is defined as a temperature of fluid that is being passed inside the piping system (106) and the valve (102), more than ambient temperature of about 25-35° C. The hot/heated fluid temperature may generally be about 45° C. to about 120° C. In another embodiment, the term "cold or chilled fluid" used in the description is defined as a temperature of the fluid being passed inside the piping system (106) and the valve (102) which is having lesser temperature than the ambient temperature of about 25-35° C. The cold/chilled fluid temperature may generally be about 16° C. to about −15° C. The fluid needs to be transferred from one location to another location without or reduced thermal loss for example, reduced heat loss in hot applications and reduced cold effect loss in case of cryogenic applications.

The term "butterfly valve" (102) in the present disclosure is interchangeably used with term "valve" (102) for brevity. It is to be understood that the term "butterfly valve" (102) and the term "valve" (102) are one and the same. The term "pre-insulation" as used herein in the disclosure is defined as a thermal insulation which is made at a factory during manufacturing or assembling of the valve (102). The insulation provided in the illustrated embodiment is made on the butterfly valve (102). However, it may be noted that the insulation of the valve (102) may also be provided on other kinds of butterfly valves (102) such as, but not limited to, a wafer style butterfly valve (not shown) and a rotary valve (not shown). The illustration explaining the insulation on the butterfly valve (102) should not be limiting to scope of the present disclosure. Also the insulation can be made on any other kind of valves similarly or with limited modifications (if required), for example, a dual plate check valve (shown in FIGS. 6-7), a balancing valve (shown in FIG. 8), a pressure independent control valve (not shown), a nozzle check valve (not shown), a gate valve (not shown).

The butterfly valve (102) illustrated in FIG. 1 will be in fluid connection in the fluid system. The fluid system may include the piping system (106) connected to a source (not shown) and extended till a destination or delivery location in a plant (not shown). The terms "piping system" (106) and "fluid pipe" (106) are interchangeably used in the description. It should be understood that the terms "piping system" (106) and "fluid pipe" (106) are one and the same. In an exemplary embodiment, the piping system (106) includes flange members (108) (more clearly shown in FIGS. 2 and 3) for enabling connection with the butterfly valve (102). In the illustrated embodiment, the piping system (106) having one such assembly of a pair of flange members (108) with one butterfly valve (102) is shown. However, it should be understood that the plant can include one or more of such assemblies which may be dependent on the requirement and design of the plant. The description of one such assembly of the valve (102) and the flange members (108) may also be applicable to other assemblies of similar construction. Each of the flange member (108) includes a plurality of holes (110) (shown in FIG. 2). about a circumference (112) (shown in FIG. 2) of the flange member (108) for connecting the flange member (108) with the pre-insulated valve body (104) (shown in FIGS. 2 and 3) of the butterfly valve (102).

Referring to FIGS. 2-4a and 4b, which illustrates various exploded views of the assembly (100) with the butterfly valve (102) shown in FIG. 1. The valve (102) includes a disc member (114) enclosed inside the valve body (104). The valve (102) further includes a valve stem (116) for operating an opening and closing of the disc member (114). The valve stem (116) is connected to a hand lever (118) of the assembly for further activation of the valve stem (116) and the disc member (114).

In an aspect of the present disclosure in the butterfly valve (102), a thermal break (not shown) is also deployed between the valve stem (116) and the hand lever (118) used to turn the valve (102). This is because the valve stem (116) is connected to the disc member (114) which comes in contact with the fluid or media and so the metallic joint may transfer some heat along the valve stem (116) all the way to an operator. The valve stem (116) is not in contact with the valve body (104) as there is an air gap and rubber O-rings (117) between them.

The flange members (108) of the each of the piping system (106) will be connected to the valve body (104) via a plurality of fasteners (120). In the illustrated embodiment shown in FIGS. 2 and 3, each fastener (120) will include, but not limited to, a strut member (122) and a nut (124). The strut member (122) can be threaded and allowed to pass through the plurality of holes (110) of the flange members (108) and a plurality of holes (126) of the valve body (104) during assembling process. In the illustrated embodiment, the plurality of holes (126) of the valve body (104) is provided at a plurality of lugs (128) provided on an outer surface (130) of the valve body (104). FIG. 4b illustrates a magnified view of a portion of the lug (128) having the hole (126). The lug (128) includes a cylindrical structure or a bulged structure having the hole (126) at its centre. The lug (128) includes an outer surface (132) having a curved profile.

Figure 4A:
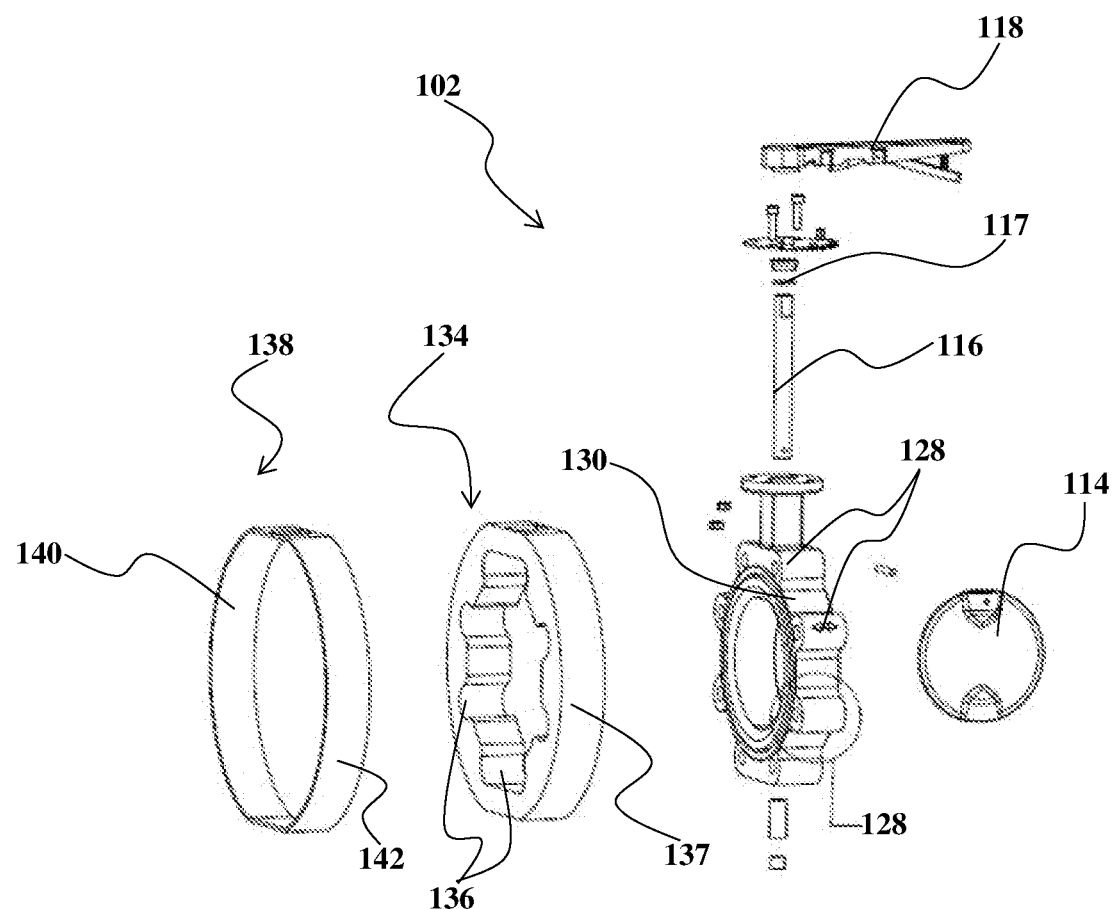
FIG. 4a shows an exploded view of the butterfly valve shown in FIGS. 1-3.
Figure 4B:
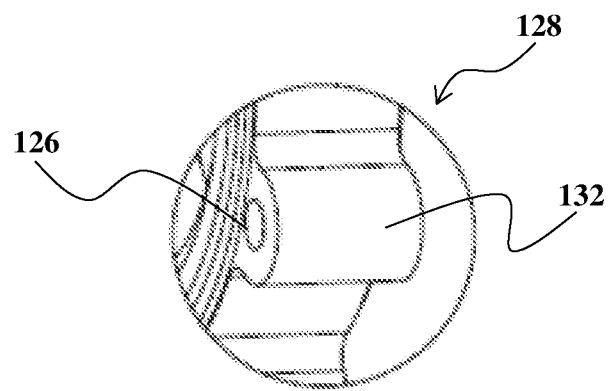
Figure 5:
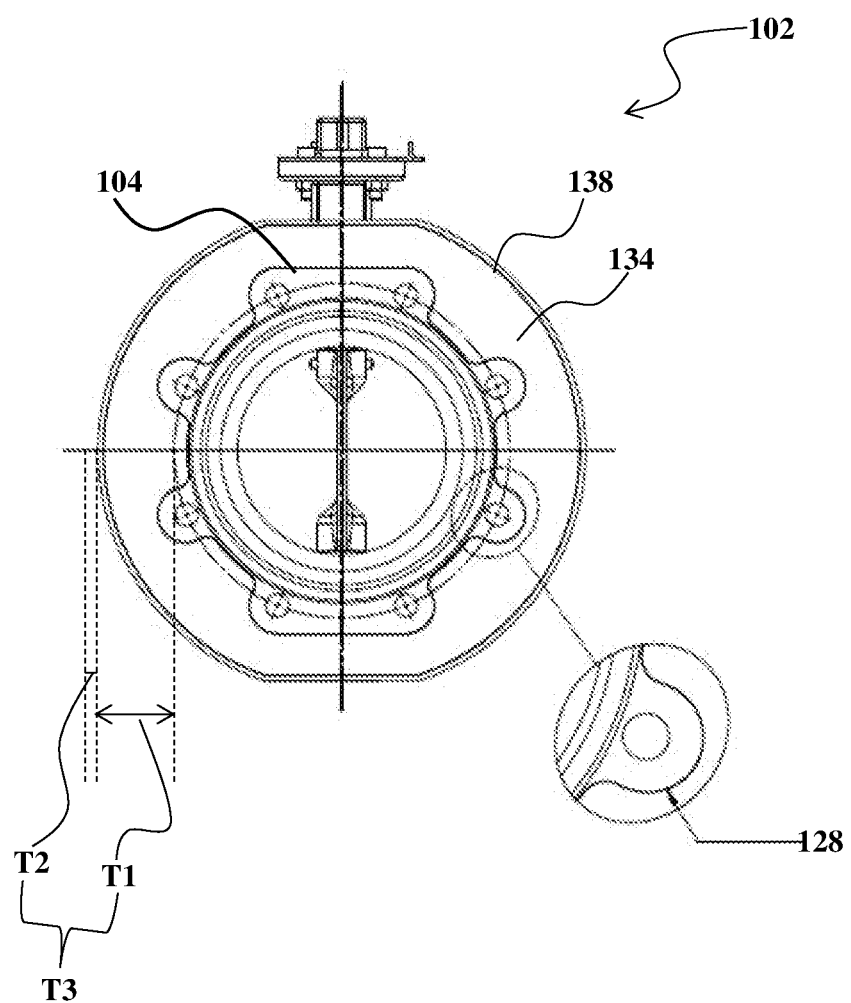
FIG. 5 shows a front view of the butterfly valve shown in FIG. 4.

FIG. 5 illustrates a front view of assembled butterfly valve (102) (shown as exploded view in FIG. 4a). As mentioned above, the outer surface (130) of the valve body (104) is provided with the plurality of lugs (128), where each lug (128) is provided with the hole (126), which align with the hole (110) of the flange members (108) for accommodating the strut member (122). Thus, fastening the valve body (104) with the flange member (108) of the fluid pipe or the piping system (106). Due to this, each lug (128) covers the strut member (122) entirely inside the lug (126). Each of the lugs (126) provided in the valve body (104) is covered with one or more insulating layers for providing insulation to the plurality of fasteners (120) and the valve body (104) such that a thermal insulation is provided for the plurality of fasteners (120) connecting the flange member (108) of the piping system (106) and the valve body (104) of the valve (102).

In the illustrated embodiment shown in FIGS. 1-5, the valve (102) includes a first insulating layer (134) made of a low density polymer. In one example, the low density polymer includes, but not limited to, poly-urethane foam, polyisocyanurate, polyethylene, polypropylene, polystyrene, foamed polystyrene, unfoamed polystyrene, polyimide, polytetrafluoroethylene, polytrifluorochloroethylene, acrylate, methacrylate polymers and copolymers, polyadipamide, polyester, polyvinyl chloride polymers and copolymers. The first insulating layer (134) is having a density ranging from about 65 to 75 kg/m$^3$, preferably 70 kg/m$^3$. The first insulating layer (134) includes a thickness "T1" ranging from about 10 mm to about 50 mm for the butterfly valves (102). The first insulating layer (134) includes an inner surface (136) which is adapted to cover the entire outer surface (132) of the plurality of lugs (128) of the valve body (104) and the entire outer surface (130) of the valve body (104) such that the first insulating layer (134) is in close physical contact with the outer surface (130) of the valve body (104) including the outer surface (132) of the plurality of lugs (128). The term "close physical contact" as used herein refers to the physical contact of the outer surface (130) of the valve body (104) with the inner surface (136) of the first insulating member (134) without leaving any space between the contacting outer surface (130) and the inner surface (136).

The valve (102) further includes a second insulating layer (138) over the first insulating layer (134). In an exemplary embodiment the second insulating layer (138) is made of a high density polymer, such as, but not limited to, a high density polyethylene material. The second insulating layer (138) includes an inner surface (140) which is adapted to be in close physical contact with the entire outer surface (137) of the first insulating layer (134). The second insulating layer (138) includes a thickness "T2" ranging from about 0.5 mm to about 5 mm for the butterfly valve (102). In an exemplary embodiment, the thickness "T1" of the first insulating layer (134) has relatively larger thickness when compared with the thickness "T2" of the second insulating layer (138).

Also, a combined thickness "T3" of the first insulating layer (134) and the second insulating layer (138) is such that a surface temperature of an outer surface (142) of the second insulating layer (138) is above a dew point to prevent condensation. That is to say, the combined thickness "T3" is made in such a way that the atmospheric temperature (which may vary according to pressure and humidity) below which water droplets begin to condense and form the dew on the second insulating layer (138) is prevented. Further, as color of the high density polyethylene being black, it has high emissivity and allows better heat loss helping to reduce the thickness of the first insulating layer (134) of the poly urethane foam. The insulation thickness and design calculations are performed as per ASTM C680 standards.

Figure 2:
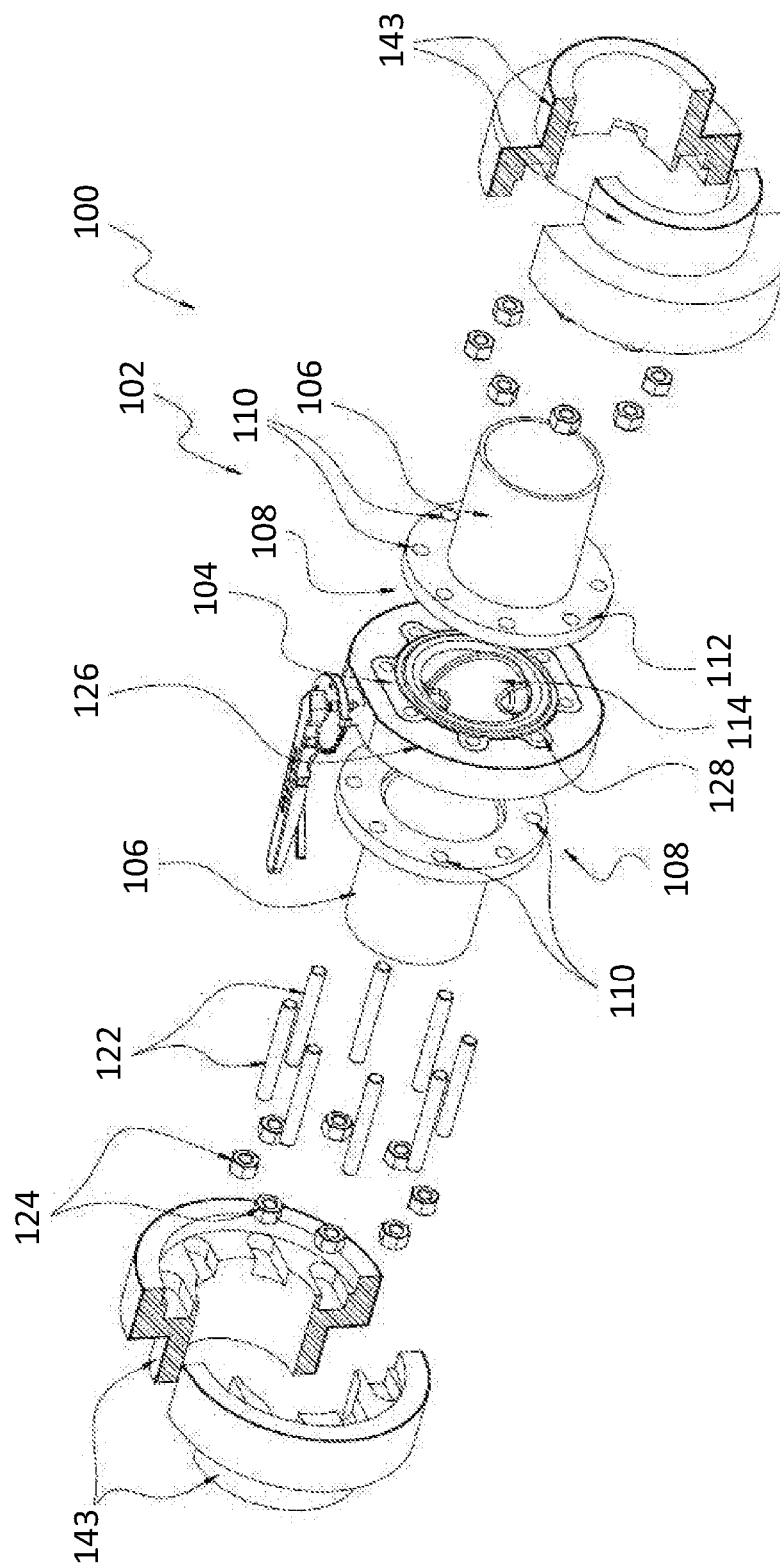
FIG. 2 shows an exploded view of the assembly of the valve shown in FIG. 1.
Figure 3:
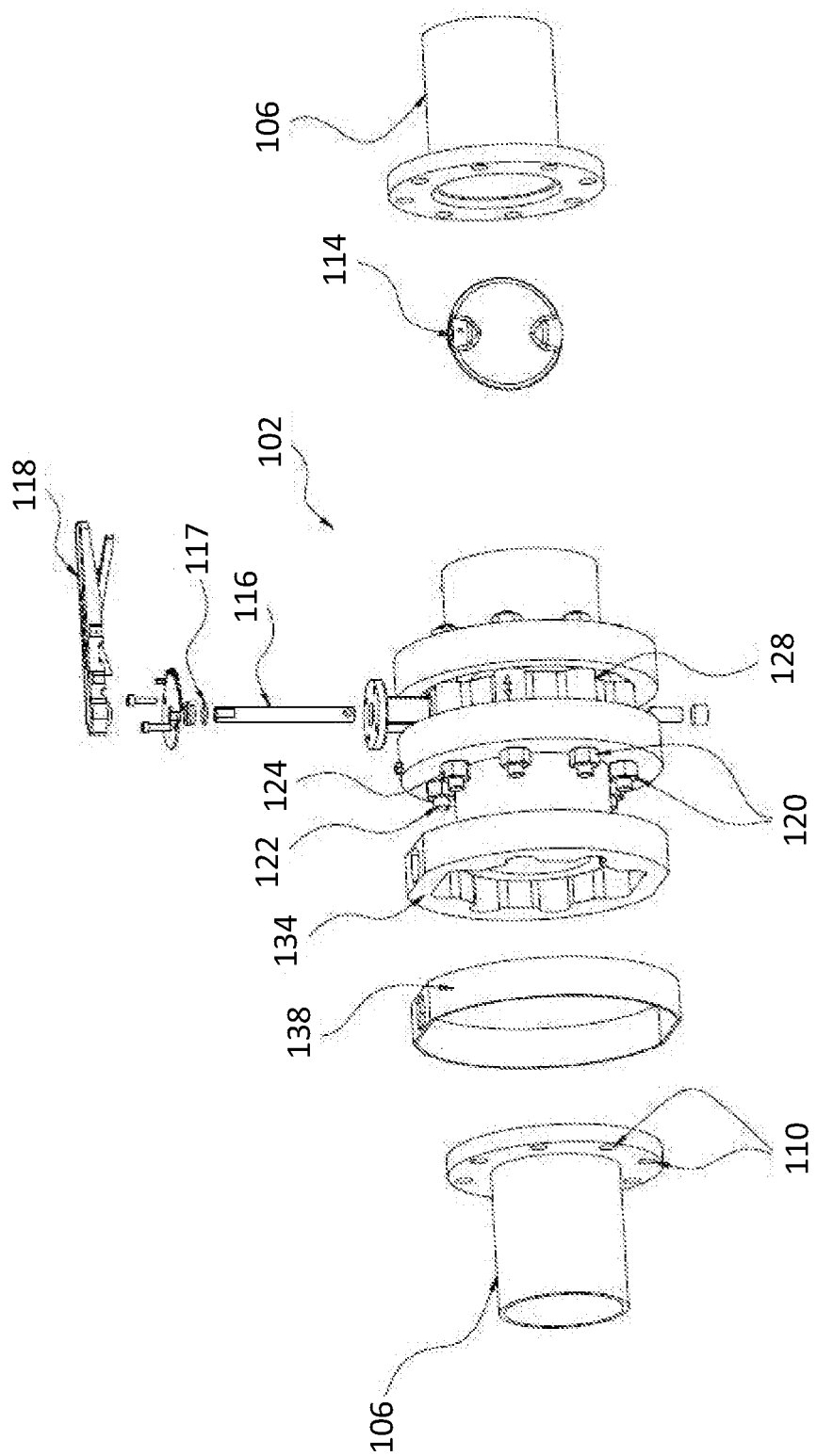
FIG. 3 shows another exploded view of the assembly of the valve shown in FIG. 1.

In an exemplary embodiment, the pre-insulated valve (102) comprises an insulation (143) (shown in FIGS. 1 and 2) external to the assembly (100) of the pre-insulated valve (102). The insulation (143) shown in said FIGS. 1 and 2 is made of a shape which conform to an external surface of the fluid pipe (106) and the flange member (108). However, it should be understood that the shape of the insulation (143) may be made in any other shapes which suits the spacing and insulation requirements. In an exemplary embodiment, the insulation (143) may be made of poly urethane foam material.

Figure 6:
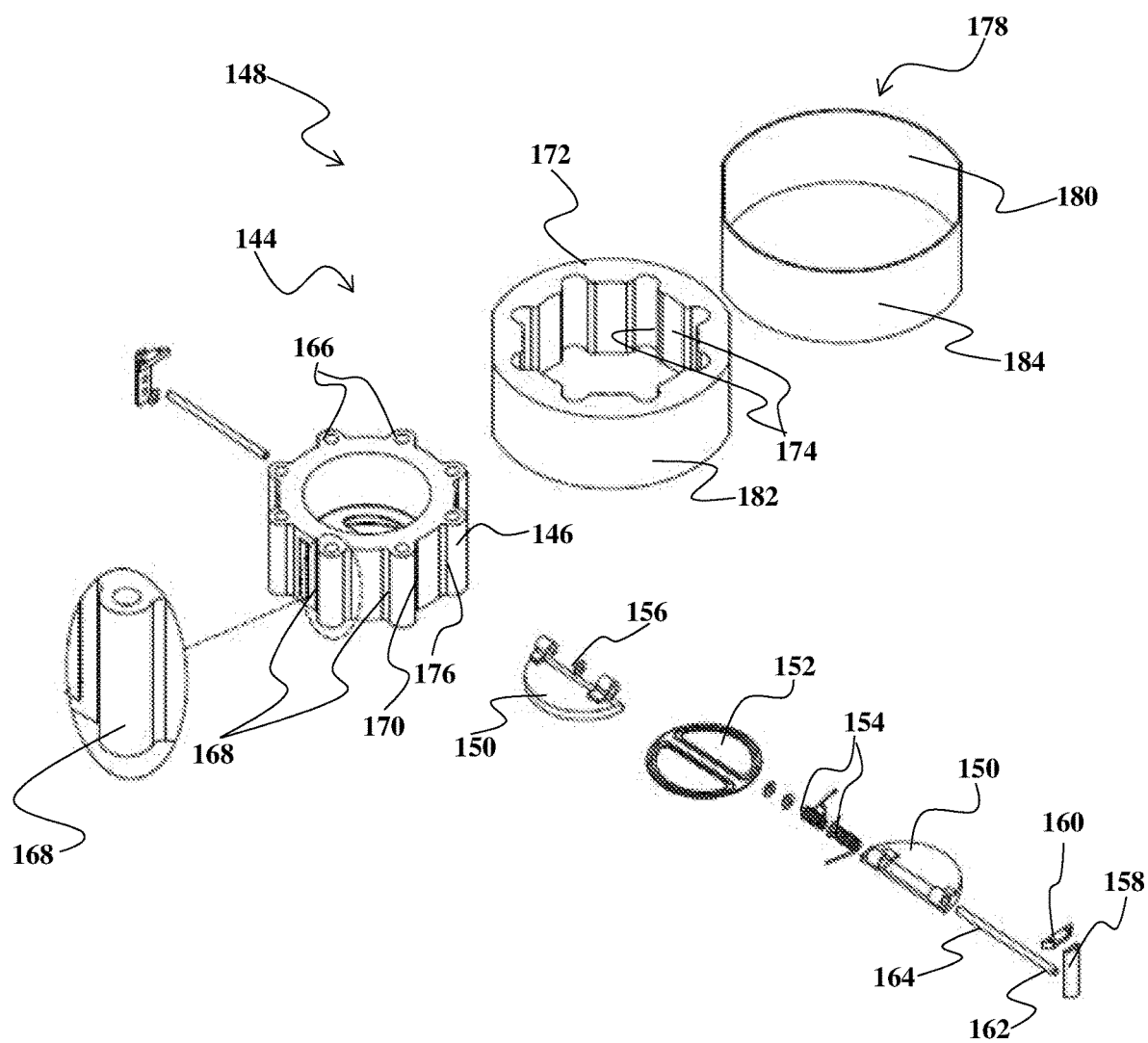
FIG. 6 shows an exploded view of a dual plate check valve with pre-insulation according to another exemplary embodiment of the present disclosure.

FIG. 6 illustrates an exploded view of the dual plate check valve (144) with pre-insulation according to another exemplary embodiment of the present disclosure. The dual plate check valve (144) in the illustrated figure includes a valve body (146) of lug-style. It may be noted that the dual plate check valve (144) or the valve may be any other valve which will be used for regulating the fluid flow inside a piping system (not shown). That is to say, the dual plate check valve (144) may typically be used to interrupt product flow such as a liquid, gas product during a process within a fluid system (not shown). For example, hot or heated fluid may include, but not limited to, water and oil. In another example, the cold fluid may include, but not limited to, liquid nitrogen, argon, helium, hydrogen and oxygen. The fluid needs to be transferred from one location to another location without or reduced thermal loss for example, reduced heat loss in hot applications and reduced cold effect loss in case of cryogenic applications.

The term "dual plate check valve" in the present disclosure is interchangeably used with term "valve" for brevity. It is to be understood that the term "dual plate check valve" and the term "valve" are one and the same. The insulation provided in the illustrated embodiment is made on the dual plate check valve (144). However, it may be noted that the insulation of the valve (144) may also be provided on other kinds of valves known in the art apart from the dual plate check valve (144). The illustration explaining the insulation on the dual plate check valve (144) should not be limiting to scope of the present invention. As the insulation can also be made on other kinds of valves similarly or with limited modifications, for example, the butterfly valve (shown in FIGS. 1-5), the balancing valve (shown in FIG. 8), the pressure independent control valve (not shown), the nozzle check valve (not shown), the gate valve (not shown).

Figure 7:
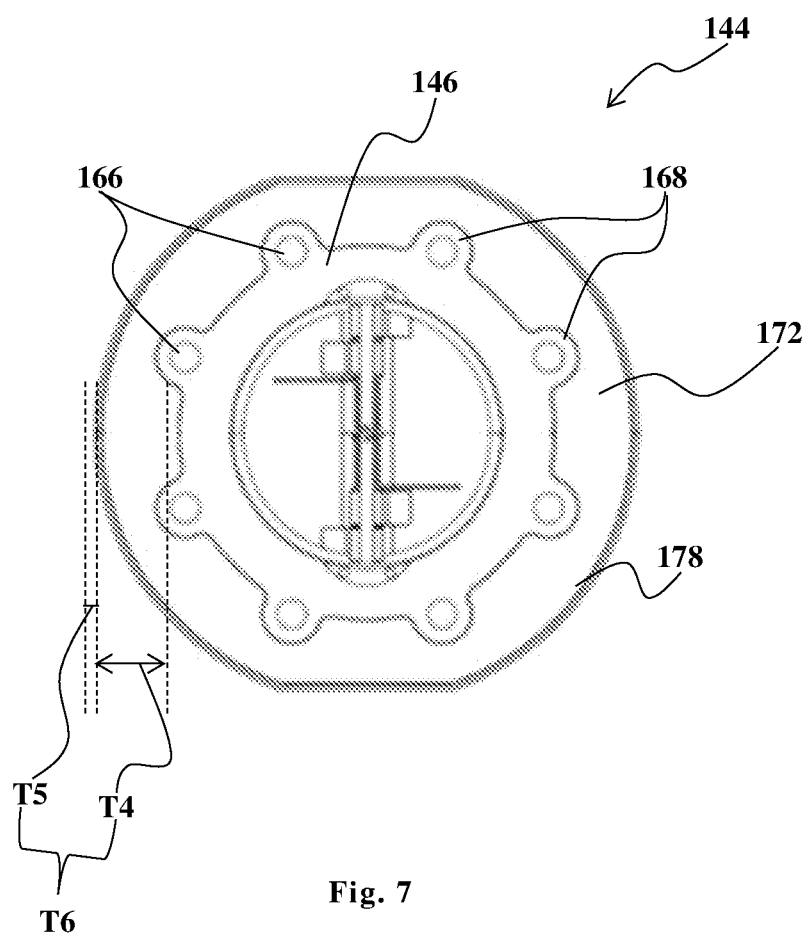
FIG. 7 shows a front view of the valve with pre-insulation shown in FIG. 6.

The dual plate check valve (144) illustrated in FIGS. 6-7 will be in fluid connection in the fluid system. In an exemplary embodiment, the piping system includes flange members (not shown) for enabling connection with the dual plate check valve (144). Each of the flange member may include a plurality of holes (not shown) around a circumference (not shown) of the flange member for connecting the flange members with the insulated valve body (146) of the dual plate check valve (144).

Furthermore, referring to FIG. 6, which illustrate an exploded view of an assembly (148) having the dual plate check valve (144). The valve (144) include a pair of plates (150) enclosed inside the valve body (146) with a sealing member (152). The valve (144) further includes spring members (154) and bearing members (156) disposed between the plates (150). Also, a pin holder (158) and a holder lock (160) is provided in the dual plate check valve (144). The pin holder (158) further includes a stop (162) and a hinge pin (164) connected to the plates (150) of the valve (144). The flange members of the each of the piping system will be connected to the valve body (146) via a plurality of fasteners (not shown). The fastener includes, but not limited to, a strut member (not shown) and a nut (not shown). The strut member is allowed to pass through a plurality of holes (not shown) of the flange members and a plurality of holes (166) of the valve body (146). In the illustrated embodiment, the plurality of holes (166) of the valve body (146) are provided at a plurality of lugs (168) provided on an outer surface (170) of the valve body (146).

FIG. 7 illustrates a front view of the dual plate check valve (144) shown in FIG. 6. As mentioned above, the outer surface (170) of the valve body (146) is provided with the plurality of lugs (168). Each lug (168) is provided with the through hole (166), which match and align with the plurality of holes of the flange members for accommodating the fastener member like the strut member. Thus, fastening the valve body (146) with the flange member of the fluid pipe. That is to say, each lug (168) covers the strut member entirely inside the lug (168). Each of the lugs (168) of the valve body (146) is covered with one or more insulating layers for providing insulation to the fastener member such thermal insulation is provided for the fastener member connecting the flange member of the piping system and the valve body (146) of the valve (144).

In the illustrated embodiment shown in FIGS. 6-7, the valve (144) includes a first insulating layer (172) made of a low density polymer. In one example, the low density polymer includes, but not limited to, poly-urethane foam, polyisocyanurate, polyethylene, polypropylene, polystyrene, foamed polystyrene, unfoamed polystyrene, polyimide, polytetrafluoroethylene, polytrifluorochloroethylene, acrylate, methacrylate polymers, copolymers, polyadipamide, polyester, polyvinyl chloride polymers and copolymers. The first insulating layer (172) is having a density ranging from about 65 to 75 kg/m$^3$, preferably 70 kg/m$^3$. The first insulating layer (172) includes a thickness "T4" ranging from about 10 mm to about 50 mm for the dual plate check valve (144). The first insulating layer (172) includes an inner surface (174) which is adapted to cover an entire outer surface (176) of the plurality of lugs (168) of the valve body (146) and an entire outer surface (170) of the valve body (146) such that the first insulating layer (172) is in close physical contact with the outer surface (176) of the valve body (146) including the outer surface (176) of the plurality of lugs (168).

The valve (144) further includes a second insulating layer (178) over the first insulating layer (172). In an exemplary embodiment the second insulating layer (178) is made of a high density polymer, such as, but not limited to, high density polyethylene material. The second insulating layer (178) includes an inner surface (180) which is adapted to be in close physical contact with an entire outer surface (182)

of the first insulating layer (172). The second insulating layer (178) includes a thickness "T5" ranging from about 0.5 mm to about 5 mm for the dual plate check valve (144). In an exemplary embodiment, the thickness "T4" of the first insulating layer (172) has relatively larger thickness when compared with the thickness "T5" of the second insulating layer (178).

Also, a combined thickness "T6" of the first insulating layer (172) and the second insulating layer (178) is such that a surface temperature of an outer surface (184) of the second insulating layer (178) is above a dew point to prevent condensation. That is to say, the combined thickness "T6" is maintained in such a way that the atmospheric temperature (which may vary according to pressure and humidity) below which water droplets begin to condense and form the dew is prevented. Further, as color of high density poly ethylene being black, it has high emissivity and allows better heat loss helping reduce the thickness of the poly urethane foam insulation. In the case of dual plate check valve (144), there is no part of the valve (144) that comes out of the insulation and so there is no risk of exposure or condensation. Also, the insulation is done in a shape other than round to make visible the shaft axis when the valve is installed in a pipe. Otherwise, if the valve insulation is done as a round, for valves like dual plate check valve (144), it will not be possible to identify whether the valve (144) is vertical or not, which is the installation direction.

In an exemplary embodiment, the pre-insulated valve (144) comprises an insulation (not shown) external to an assembly (148) of the pre-insulated valve (144). The insulation can be made of shapes which conform to an external surface of the fluid pipe (not shown) and the flange member. However, it should be understood that the shape of the insulation may be made in any other shapes which suits the spacing and insulation requirements. In an exemplary embodiment, the insulation may be made of poly urethane foam material.

Figure 8:
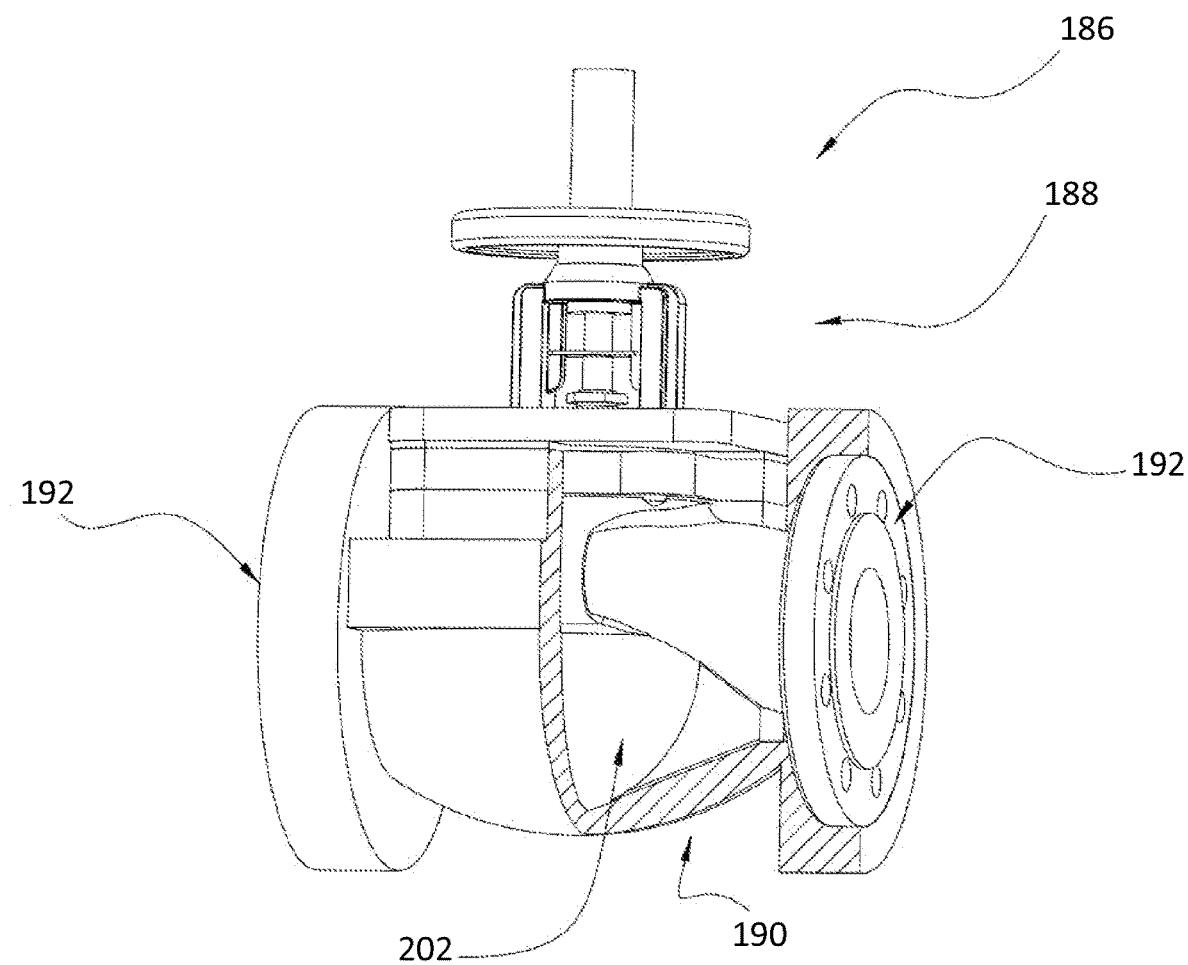
FIG. 8 shows a front view of an assembly of a balancing valve according to yet another embodiment of the present disclosure.
Figure 9A:
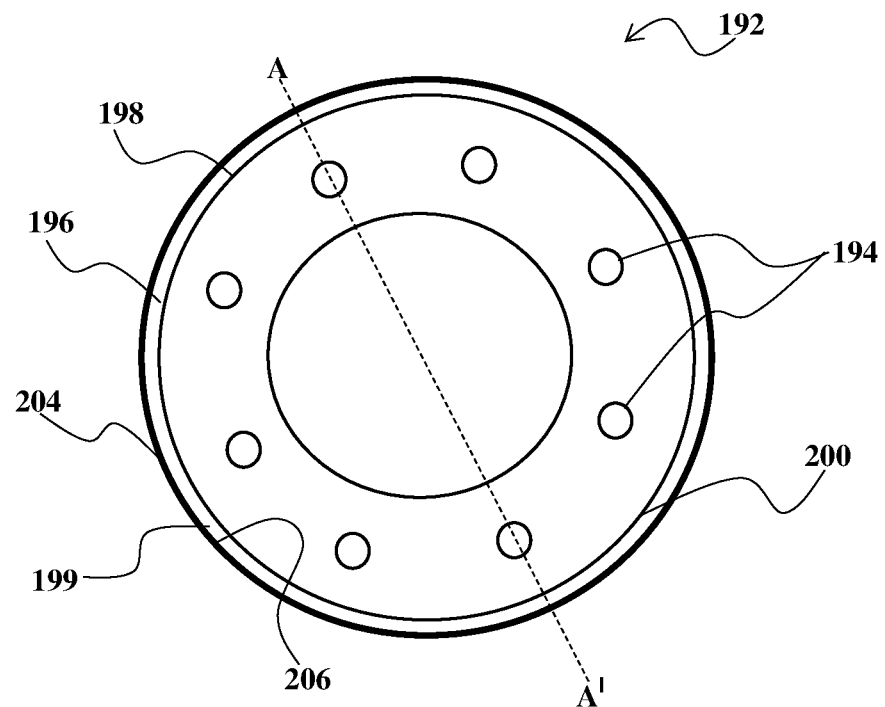
FIG. 9a shows a side view of a flange member of the balancing valve shown in FIG. 8.
Figure 9B:
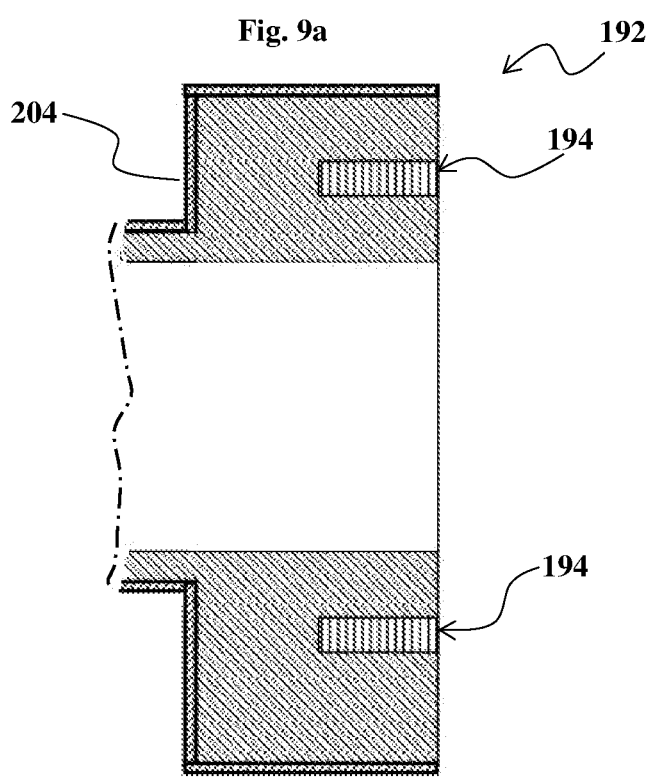

FIG. 8 illustrates a front view of an assembly (186) of a balancing valve (188) according to yet another embodiment of the present disclosure. The balancing valve (188) or the pre-insulated valve (188) for a fluid system (not shown) includes a valve body (190) having a pair of flange members (192), each flange member (192) being provided with a plurality of blind holes (194) (shown in FIGS. 9a and 9b) for accommodating a fastener member (not shown) for fastening the valve body (190) with a flange member (not shown) of a fluid pipe (now shown). The valve (188) further includes a first insulating layer (196) (shown in FIG. 9a) made of a low density polymer, the first insulating layer (196) comprising an inner surface (198) (shown in FIG. 9a) being adapted to cover an entire outer surface (200) (shown in FIG. 9a) of the pair of flange members (192) of the valve body (190) and an entire outer surface (202) (shown in FIG. 8) of the valve body (190) such that the first insulating layer (196) is in close physical contact with the outer surface (202) of the valve body (190) including the outer surface (200) of the pair of flange members (192). The valve (188) further includes a second insulating layer (204) (shown in FIGS. 9a and 9b) made of a high density polymer, the second insulating layer (204) comprising an inner surface (206) (shown in FIG. 9a) being adapted to be in close physical contact with the entire outer surface (199) of the first insulating layer (196).

The blind holes (194) of the pair of flange members (192) are threaded for accommodating the plurality of fasteners (not shown). The flange member (192) of the pipe includes a plurality of through holes axially aligned with the blind holes (194) of the flange members (192) of the valve body (190). The threaded portion of the plurality of fasteners is enclosed wholly inside the blind holes (194) of the flange member (192) of the valve body (190) and inside the plurality of through holes of the flange member of the pipe.

In an exemplary embodiment shown in FIG. 8, the first insulating layer (196) is made of poly-urethane foam material, having a density ranging from about 65 to 75 kg/m$^3$, preferably 70 kg/m$^3$. In another embodiment, the second insulating layer (204) is made of high density polyethylene material. The first insulating layer (196) has relatively larger thickness when compared with the second insulating layer (204). In an embodiment a combined thickness of the first insulating layer (196) and the second insulating layer (204) is such that a surface temperature of an outer surface (208) of the second insulating layer (204) is above a dew point to prevent condensation.

In an exemplary embodiment, the pre-insulated valve (188) comprises an insulation (not shown) external to an assembly (186) of the pre-insulated valve (188). The insulation can be made of shapes which conform to an external surface of the fluid pipe (not shown) and the flange member. However, it should be understood that the shape of the insulation may be made in any other shapes which suits the spacing and insulation requirements. In an exemplary embodiment, the insulation may be made of poly urethane foam material.

Other types of insulation systems are also used for factory-pre-insulation of piping and valves and may be applied such that the valve connection to the piping along with the flange bolts within the insulation are preserved.

Advantages

The pre-insulated valves disclosed in the disclosure solves the problems of on-site insulation as well as pre-insulated valves as attempted in the prior arts. The disclosure includes keeping the valve bolting within the insulation area and also keeping it on the flange metal face ensuring that the bolting joints are as per design and hence perform their function of preventing leaks between the flanges.

In an embodiment, for valves where lugged designs are possible, this is done by using full face-to-face lugs (also called 'solid lugs' in some parlance). In such valves, the bolting passes through the lugs and hence is fully enclosed by the lugs.

In another embodiment, for valves where the above is not possible, and the valves are flanged, this is done by making the bolts be threaded into the flanges instead of being through the flange. Normally, the bolts pass through the valve flange and are tightened on one side in the pipe flange and on the other side on the valve flange. In this case, the tightening on the pipe flange is the same by the bolts and are threaded into the valve flange so that they stay within the insulation which has been done all around the flange.

In an embodiment, the valves are chosen to be of lugged design and then doing the insulation on top of that. This brings the valve bolting to be within the insulation envelope attached to the valve. It also ensures the flanges and bolting remain of standard design because they do not have to be made larger to go outside the valve insulation layer.

In an embodiment, the bolting is done on the flange's metal face and not on top of the insulation on the flange, and it preserves the design conditions of the valve. The flanges themselves can be insulated on-site. The flanges being of regular design and standardized can be insulated on-site effectively and without high cost.

In an embodiment, the insulation also brings the valve identification information to the outside of the piping, where otherwise, if the valve is insulated on-site, its markings may be lost and hidden under the insulation and it may not possible to find out which valve (for example, manufacturer or serial number) is installed at a location and maintenance and/or service and repair may become problematic.

In an embodiment, pre-insulated piping components, including pipes, fittings, flanges and valves improves the site performance and cost outcomes by being easy and quick to install and commission, significantly cutting down on-site labour costs, and being factory certified to have well designed and adequate insulation.

In an embodiment, the disclosed pre-insulated valve reduces energy consumption, sound pollution and improve the comfort and quality of life in new of existing installations and buildings.

In an embodiment, the thermal insulation in the disclosed pre-insulated valve reduces heat wastage, i.e., less energy is required for heating and cooling systems.

In an embodiment, the disclosed pre-insulated valve reduces fuel bills and associated running costs.

In an embodiment, the disclosed pre-insulated valve counteracts global warming by reducing carbon dioxide emissions.

In an embodiment the disclosed pre-insulated valve provides an even insulation in the valve caused by the first insulating layer and second insulating layer, thereby provides insulation in all the parts of the pre-insulation and overcomes the problem of uneven surfaces of the valves and flanges caused by the manual labour.

In an embodiment, the disclosed pre-insulated valve being insulated at the factory, all the valves can be standardized. Thus, overcoming the problem of standardizing workmanship due to manual insulation.

In an embodiment, the disclosed pre-insulated valve overcomes the problem of availability of efficient labour.

In an embodiment, the disclosed pre-insulated valve overcomes the problem of peeling-off of the external insulation due to no exposure of insulation material of fasteners of the pre-insulated valve to the external environment.

In an embodiment, the disclosed pre-insulated valve overcomes the problem of peeling-off due to lesser or no vibrations in the valve.

In an embodiment, the disclosed pre-insulated valve provides a rapid installation and quick turnaround time.

In an embodiment, the disclosed pre-insulated valve is designed to prevent condensation as per the standard IS: 1436 (1988).

In an embodiment, the disclosed pre-insulated valve reduces capital cost and has been fully realized.

In an embodiment, the disclosed pre-insulating valve produces low smoke emission and fire retardant material.

In an embodiment the disclosed pre-insulating valve reduces insulation thickness to about 50% compared with cork insulation due to the usage of poly urethane insulation material. Also, about 44% compared with expanded polystyrene or fibre glass.

In an embodiment, the disclosed pre-insulating valves does not require special/oversized flanges, as original pipe size flange will accommodate the valve.

In an embodiment, the second insulating layer provided as a cladding over the first insulating layer, prevents the peeling and damage of the first insulating layer of the valve during transportation and site handling, thereby ensuring increased life of the first insulating layer.

In an embodiment, re-insulation on the second insulating layer may not be required as the combined thickness of the first insulating layer and the second insulating layer are optimized for reducing/eliminating the condensation problem.

In an embodiment, the insulating materials used in the pre-insulated valve conform to the fire performance to class P as per BS 5476 part 5 for ignitability.

In an embodiment, the insulation is installed such that the insulation does not interfere with flanged gasket joint with valve. Installation bolts connecting valve to flanges have seated on the flange metal face as per flange design and not sit on top of the insulation material.

In an embodiment, valves of lugged design insulation with lugs are having same thickness as of the valve. This ensures that a bolting is also included within the insulation. Further, flanged valves are converted from pass through flange bolts to bolts that thread into a valve flange. The insulation of the valves is considered along with the aspect of insulation properties of material and ambient conditions along with temperature of media within the valve.

INDUSTRIAL APPLICABILITY

The disclosed pre-insulated valves find its potential application in fluid system, where there is a requirement of insulation at a piping system which includes the valves for regulating the fluid flow through the valve. The fluid may include hot or cold liquids. The disclosed pre-insulated valves may also find its applications where hot air or cold air or gases may require to be transported from one location to another location in a plant.

While aspects of the present invention have been particularly shown and described with reference to the embodiments above, it will be understood by those skilled in the art that various additional embodiments may be contemplated by modification of the disclosed device without departing from the scope of what is disclosed. Such embodiments should be understood to fall within the scope of the present invention as determined based upon claims and any equivalents thereof.

LIST OF REFERENCE CHARACTERS

100: Assembly
102: Butterfly valve or valve
104: Valve body
106: Piping system or fluid pipe
108: Flange members
110: Plurality of holes
112: Circumference
114: Disc member
116: Valve stem
117: O-rings
118: Hand lever
120: Plurality of fasteners
122: Strut member
124: Nut
126: Plurality of holes
128: Plurality of lugs
130: Outer surface of valve body (104)
132: Outer surface of lugs (128)
134: First insulating layer
136: Inner surface of first insulating layer (134)
137: Outer surface of first insulating layer (134)
138: Second insulating layer
140: Inner surface of second insulating layer 142: Outer surface of the second insulating layer
143: Insulation
144: Dual plate check valve
146: Valve body
148: Assembly
150: Pair of plates
152: Sealing member
154: Spring member
156: Bearing member
158: Pin holder
160: Holder lock
162: Stop
164: Hinge pin
166: Plurality of holes
168: Plurality of lugs
170: Outer surface of valve body (146)
172: First insulating layer
174: Inner surface of first insulating layer (172)
176: Outer surface of lugs (168)
178: Second insulating layer
180: Inner surface of second insulating layer (178)
182: Outer surface of the first insulating layer (172)
184: Outer surface of the second insulating layer (178)
186: Assembly
188: Balancing valve or valve
190: Valve body
192: Flange member of the valve body (190)
194: Blind holes
196: First insulating layer
198: Inner surface of the first insulating layer (196)
199: Outer surface of the first insulating layer (196)
200: Outer surface of the flange member (192)
202: Outer surface of the valve body (190)
204: Second insulating layer
206: Inner surface of the second insulating layer (204)
208: Outer surface of the second insulating layer (204)
T1: Thickness of first insulating layer (134)
T2: Thickness of second insulating layer (138)
T3: Combined thickness of the first and second insulating layers (134, 138)
T4: Thickness of first insulating layer (172)
T5: Thickness of second insulating layer (178)
T6: Combined thickness of the first and second insulating layers (172, 178)
A-A': Axis

We claim:

1. A pre-insulated valve for a fluid system, the pre-insulated valve comprising:
a valve body having a plurality of lugs on an outer surface of the valve body, each lug of the plurality of lugs comprising a cylindrical or bulged structure having a hole at a center of the cylindrical or bulged structure, the hole accommodating a fastener member for fastening the valve body with a flange member of a fluid pipe,
a disc member enclosed inside the valve body, the disc member connected to a valve stem operable to open and close the disc member to control flow through the valve body,
a first insulating layer made of a low density polymer, the first insulating layer comprising an inner surface being adapted to cover an entire outer surface of the plurality of lugs of the valve body and an entire outer surface of the valve body such that the first insulating layer is in physical contact with the entire outer surface of the valve body including the entire outer surface of the plurality of lugs, and
a second insulating layer made of a high density polymer, the second insulating layer comprising an inner surface in physical contact with an entire outer surface of the first insulating layer,
wherein the first insulating layer has a relatively larger thickness when compared with a thickness of the second insulating, and
wherein the hole in each of the lugs and the fastener members remains accessible with the first insulating layer and the second insulating layer in place.

2. The pre-insulated valve of claim 1, wherein the first insulating layer is made of poly-urethane foam material.

3. The pre-insulated valve of claim 1, wherein the first insulating layer comprises a density ranging from about 65 to 75 kg/m$^3$.

4. The pre-insulated valve of claim 1, wherein the second insulating layer is made of high density polyethylene material.

5. The pre-insulated valve of claim 1, further comprising a further layer of insulation on an external surface of the pre-insulated valve.

6. A pre-insulated valve for a fluid system, the pre-insulated valve comprising:
a valve body having a pair of flange members, each flange member being provided with a plurality of threaded blind holes accommodating a fastener member for fastening the valve body with a flange member of a fluid pipe,
a disc member enclosed inside the valve body, the disc member connected to a valve stem operable to open and close the disc member to control flow through the valve body,
a first insulating layer made of a low density polymer, the first insulating layer comprising an inner surface being adapted to cover an entire outer surface of the pair of flange members of the valve body and an entire outer surface of the valve body such that the first insulating layer is in physical contact with the entire outer surface of the valve body including the entire outer surface of the pair of flange members, and
a second insulating layer made of a high density polymer, the second insulating layer comprising an inner surface in physical contact with an entire outer surface of the first insulating layer,
wherein the first insulating layer has a relatively larger thickness when compared with a thickness of the second insulating layer, and
wherein the plurality of threaded blind holes and the fastener members remain accessible with the first insulating layer and the second insulating layer in place.

7. The pre-insulated valve of claim 6, wherein the first insulating layer is made of poly-urethane foam material.

8. The pre-insulated valve of claim 6, wherein the first insulating layer comprises a density ranging from about 65 to 75 kg/m$^3$.

9. The pre-insulated valve of claim 6, wherein the second insulating layer is made of high density polyethylene material.

10. The pre-insulated valve of claim 6, further comprising a further layer of insulation on an external surface of the pre-insulated valve.

* * * * *